United States Patent [19]

Planeix

[11] Patent Number: 5,670,773

[45] Date of Patent: Sep. 23, 1997

[54] PROCESS FOR THE SPACE LOCALIZATION OF THE FOCAL POINT OF A LASER BEAM OF A MACHINING MACHINE AND EQUIPMENT FOR PERFORMING THIS PROCESS

[75] Inventor: Alain Planeix, Romagnat, France

[73] Assignee: Aerospatiale Societe Nationale Industrielle, Paris, France

[21] Appl. No.: 555,005

[22] Filed: Nov. 9, 1995

[30] Foreign Application Priority Data

Nov. 9, 1994 [FR] France .................. 94 13468

[51] Int. Cl.$^6$ .................................. G02B 7/04
[52] U.S. Cl. .................. 250/201.2; 250/559.13; 219/121.78
[58] Field of Search .................. 250/201.2, 201.4, 250/559.13, 559.15; 219/121.78, 121.79, 121.81

[56] References Cited

U.S. PATENT DOCUMENTS

| | | | |
|---|---|---|---|
| 3,891,857 | 6/1975 | Wiklund | 250/559.15 |
| 4,037,958 | 7/1977 | Schmidt et al. | 250/201.2 |
| 4,363,962 | 12/1982 | Shida | 250/201.4 |
| 4,761,561 | 8/1988 | Fujiwara et al. | |
| 4,939,377 | 7/1990 | Okuda et al. | 250/559.15 |
| 5,521,374 | 5/1996 | Cray et al. | 250/201.2 |

FOREIGN PATENT DOCUMENTS 2675643  10/1992  France .

*Primary Examiner*—Edward P. Westin
*Assistant Examiner*—Kevin Pyo
*Attorney, Agent, or Firm*—Michael N. Meller

[57] ABSTRACT

In order to localize in space a focal point of a laser beam (14) of a machining machine with respect to a work table (18) thereof, the table is fixed an equipment (22) comprising a square target (20) and impact detectors such as illumination or light sensors. In a first plane (YOZ) perpendicular to the target plane localization takes place of the impact points of the beam with the edges of the target perpendicular to the first plane, by placing an estimated focal point (PFE) at a given distance d above and below the target. Thus, determination takes place of a first calculated value (PFC1) of the focal point. This operation is repeated at least once in the plane (YOZ) and then the same operations are performed in another plane (XOZ) in order to obtain a precise and reproducible space localization of the focal point.

14 Claims, 3 Drawing Sheets

PROCESS FOR THE SPACE LOCALIZATION OF THE FOCAL POINT OF A LASER BEAM OF A MACHINING MACHINE AND EQUIPMENT FOR PERFORMING THIS PROCESS

BACKGROUND OF THE INVENTION

1. Field of the Invention

The invention relates to a process making it possible to localize in space the focal point of a laser beam passing out of the nozzle of a laser machining machine such as a cutting or welding machine, with respect to a work table of said machine.

2. Description of the Prior Art

The invention also relates to an equipment designed for mounting on the work table of a machining machine using a laser beam for performing the laser beam focal point space localization process.

On a machining machine using a laser beam, the beam from the laser source travels up to the part to be machined by means of a relatively large number of reflecting mirrors (e.g. nine mirrors), a collimating lens making it possible to reduce the natural divergence effect of the beam, and a focussing lens permitting the concentration of the laser beam at a point known as the focal point. The positioning of said focal point with respect to the machined part is extremely important, because it is at this point that the maximum usable power density occurs. Thus, the focal point must be located on the surface of the part on a cutting or welding machine.

A more precise analysis of the optical phenomena and in particular the taking into account of chromatic aberration phenomena shows that in reality the focal point is constituted by a spot. Moreover, the power distribution in this spot varies as a function of the transverse electromagnetic modes (TEM) of the laser source. Throughout the present application the term "focal point" consequently designates the spot obtained when the laser beam strikes a surface at the same distance from the laser beam focussing lens as the focal distance of said lens.

On machining machines using a laser beam, the optical path followed by the beam is subject to deviations with respect to the theoretical optical path, particularly as a result of orientation defects of the mirrors and their wear. These optical path deviations influence the position of the focal point with respect to the nozzle. This focal point position is also influenced by the laser source characteristics, by abnormalities, as well as by the focussing lens. Thus, the focal point position is subject to variations with respect to the mechanical structure of the machine and certain of these are completely independent of said mechanical structure.

Consequently the specificity of machining machines using a laser beam requires the addition to the mechanical settings and adjustments which have to be periodically performed for checking the state of the mechanism, as on conventional programmed machining machines, supplementary adjustments aiming at localizing the focal point of the laser beam in space with respect to the machining work table.

Thus, the adjustment of a machining machine using a laser beam is broken down into different operations. During a first operation, the operator investigates the "machine tool point", i.e. the position mechanically reached by the laser beam exit nozzle with respect to the machine work table. When this first operation is at an end, the investigator investigates the "laser tool point", i.e. the position of the focal point with respect to the work table. The comparison between these two points defines a correction vector, which is automatically taken into account during machining. Moreover, for each machining arrangement with respect to a part, another procedure enables the operator to investigate the "equipment point", i.e. the starting point of the program relating to the machining of said part.

The first of these operations, during which the "machine tool point" is investigated, takes place by means of an internal subprogram of the digital control of the machine. This is a complex procedure during which a capacitive transducer, mounted on the head of the nozzle, investigates the centre of a reference sphere mounted on the machine work table. This procedure authorizes a precise localization of the sought "machine tool point" to within 2/100 mm.

The investigation of the "equipment point" which has to be performed for any machining arrangement in order to know the starting point of the cycle of a part, takes place in similar manner with the aid of the capacitive sensor equipping the laser beam exit nozzle head, using a space reference known as a datum mounted on the work table. Thus, this procedure has the same qualities as that during which the "machine tool point" is determined.

However, the operation during which the laser beam focal point is localized in space relative to the work table does not at present have the same precision and reproducibility qualities as the two others.

This is mainly explained by the fact that this operation of investigating the focal point is based on the visual localization of a blue flame, at the location where the laser beam strikes a reference cylinder fixed to the work table. This blue flame, produced by the impact of the laser beam on the reference cylinder, reveals the location of the greatest power density. As a result of the fact that the precise localization of the blue flame is difficult to control, the operator can investigate the extreme appearance points of said blue flame in the vertical direction and then form the mean therefrom in order to obtain the vertical position of the focal point. The focal point is then localized in the horizontal plane by observing blue flames produced by the four impacts of the laser beam on four points of the cylinder at peripheral locations mutually displaced by 90°.

All these operations necessary for the determination of the focal point, as well as the subsequent checking operations not described here, can take roughly three hours and have only a relative precision.

Thus, the visual investigation of the blue flame making it possible to obtain the position of the focal point leads to a significant dispersion of the measured values, as a function of the operator. It has in particular been evaluated that the dispersion concerning the vertical direction focal point position is approximately 0.6 mm for different operators. Although this has not been quantified, the same observation could be made with respect to the focal point localization in the horizontal plane.

Thus, the setting and adjustment procedures used at present on laser beam machining machines do not permit a sufficiently precise and repetitive space localization of the focal point in order to guarantee a maximum efficiency of the machining machine.

SUMMARY OF THE INVENTION

The invention specifically relates to a novel process permitting the localization in space of the focal point of the laser beam of a machining machine relative to the work table of said machine, in a sufficiently precise and repetitive manner to permit, in association with other existing adjusting operations, the obtaining of a maximum efficiency due to the precise localization of the focal point on the surface of the cutting or welding machine, as a function of the particular case.

According to the invention, this result is obtained by means of a process for the space localization of the focal point of a laser beam of a machining machine relative to a work table of said machine, characterized in that it comprises the following steps:

a—fixing to the work table a target having four edges forming a square in a first plane, b—emission of the laser beam in such a way that its axis is perpendicular to the first plane, displacement of the laser beam in a second plane perpendicular to the first plane and to two first opposite edges of the target, in such a way that an estimated position of the focal point of the laser beam is successively placed in two working planes parallel to the first plane and substantially at the same distance on either side of said first plane, detection of a first series of four impact points of the laser beam on the first two opposite edges of the target, and determination of a calculated position of the focal point in the second plane located at the intersection of the two lines connecting the impact points on the opposite edges of the target and in the two working planes, c—repetition of step b at least once, by successively placing the position of the last calculated focal point on either side of the first plane, d—repetition of steps b and c in a third plane perpendicular to the first and second planes, to determine a calculated position of the focal point in said third plane.

In a preferred embodiment of the invention, detection takes place of the impact points by fixing impact localization means on the work table. These impact localization means are either light sensors or heat sensors.

Thus, in this first, preferred embodiment, the target and four impact localization means are installed in a support, so that the impact localization means are oriented towards the intersections of the edges of the target with the second and third planes and the support is fixed to the work table.

In order that the other machine adjustment operations can be carried out with the aid of the same arrangement, use is made of a support having reference marks or fixers permitting a space localization of a nozzle emitting the laser beam with respect to the work table.

Advantageously use is made of a target constituted by a square metal sheet, which is fixed in parallel to an upper face of the work table.

In order to obtain a maximum precision in the measurements performed, the working planes are located at an optimum distance of a few dozen millimeters on either side of the first plane.

In a preferred embodiment of the invention, step b is repeated once in order to detect a second series of four impact points, four calculated positions of the focal point in the second plane are determined on the basis of the first and second series of impact points, and the mean of these four calculated positions is calculated in order to obtain the localization of the focal point in the second plane.

The invention also relates to an equipment for the space localization of the focal point of a laser beam of a machining machine with respect to a work table of the latter, characterized in that it comprises a support fixable to the work table, an interchangeable target constituted by a square metal sheet mounted on the support at a given location and according to a given orientation, and four impact localization means mounted in the support so as to be oriented towards the four edges of the target.

In a preferred embodiment of said equipment, the location for receiving the target comprises a planar surface parallel to one face of the support and fixable to the work table and two edges overhanging said planar surface, forming between them a right angle, means being provided in order to keep the target in engagement on the planar surface and against the overhanging edges.

Advantageously, the target maintaining means then incorporate elastic means engaging the target against the overhanging edges and a magnetic means engaging the target against the planar surface.

The impact localization means can be illumination or light sensors. The equipment then has a protective cover provided with windows for the passage of the laser beam. In this case, the interior of the cover and the support are painted matt black.

DRAWINGS

DETAILED DESCRIPTION

The process according to the invention permitting the localization in space of the focal point of a laser beam of a machining machine relative to the work table of said machine is intended to be integrated into the adjustment or setting process used on laser beam machining machines.

More specifically, the laser beam focal point space localization process is intended to be carried out after the "machine tool point" has been localized in accordance with conventional procedures and prior to the investigation of the "equipment point", which must be carried out according to conventional procedures before the programmed machining of a different type of parts. The conventional setting and adjustment stages constituted by the investigation of the "machine tool point" and the "equipment point" do not form part of the invention, so that no description thereof will be given. It is also pointed out that the process according to the invention can in certain cases be performed completely independently of said other known setting stages.

The principle of said process will be described with successive reference to FIGS. 1A, 1B and 2.

Figure 1A:
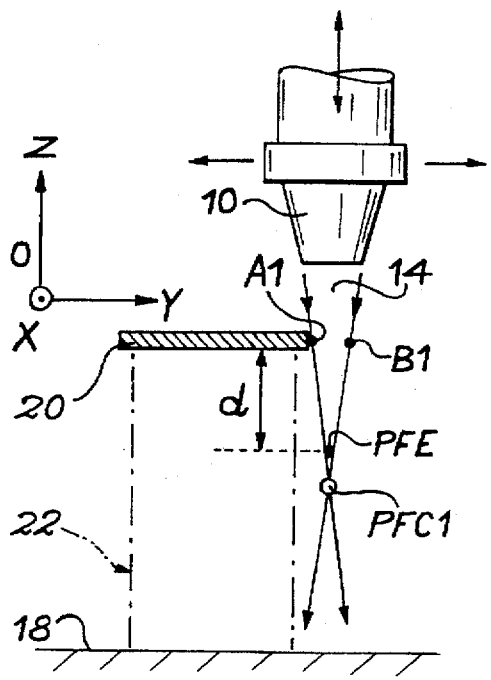
FIGS. 1A and 1B show diagrammatically the detection and localization of four impact points of the laser beam on two opposite edges of a square target, according to a first performance step of the process according to the invention.
Figure 1B:
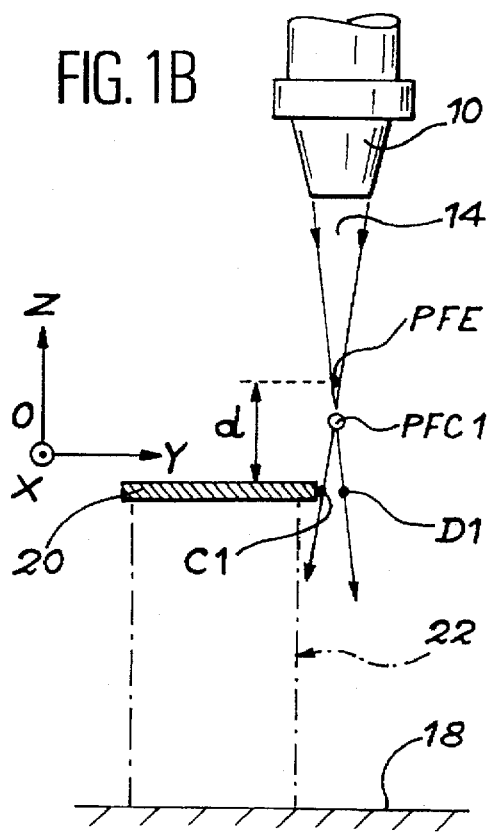

In FIGS. 1A and 1B, the reference 10 designates the nozzle of a machining machine using a laser beam. As a function of the particular case, said machining machine can be a cutting or a welding machine. The nozzle 10 is mounted at the end of a not shown, articulated arm making it possible to orient the nozzle for machining purposes. Due to the articulated arm, the nozzle 10 consequently has a certain number of degrees of freedom (e.g. three degrees of translation freedom and two degrees of rotation freedom).

The laser beam from the not shown source travels within the articulated arm in the form of a parallel beam reflected by mirrors located in the articulations. A not shown, focussing beam transforms the parallel beam into a convergent beam 14 on leaving the nozzle 10. Thus, the laser beam 14 leaving the nozzle 10 is concentrated towards the real focal point, whose position is to be determined with the maximum possible accuracy relative to the machine work table. This work table is diagrammatically illustrated at 18 in FIGS. 1A and 1B.

For carrying out the desired space localization of the real focal point with respect to the work table 18, a target 20 is fixed to the latter. For this purpose use is made of an equipment 22, whereof a preferred embodiment will be described hereinafter relative to FIGS. 3 to 5.

The target 20 is constituted by a square metal sheet mounted on the equipment 22, so as to be located in a horizontal plane at a given distance above the horizontal plane of the work table 18.

On associating with the work table 18 an orthonormal reference OXYZ, in which OX and OY designate two horizontal directions perpendicular to one another and OZ a vertical direction, the sides of the square formed by the target 20 are pairwise parallel respectively to the directions OX and OY.

In the process according to the invention, successive localization takes place of the focal point of the laser beam 14 in vertical planes YOZ and XOZ. FIGS. 1A, 1B and 2 illustrate the localization of the focal point in the plane YOZ. The localization of the focal point in the plane XOZ takes place by repeating in said first plane the operations which will now be described within the framework of the localization of the focal plane in the plane YOZ.

When the target 20 is mounted on the work table 18 by means of the equipment 22, the machining machine is started up in order to emit the focussed laser beam 14 through the nozzle 10. The nozzle 10 is then oriented in such a way that the axis of the laser beam 14 remains vertical, i.e. parallel to the axis OZ and perpendicular to the horizontal plane containing the target 20. The nozzle 10 is firstly placed at a level such that the estimated position PFE of the focal point is in a working plane at a given distance d below the target 20. Under these conditions and as illustrated in FIG. 1A, the nozzle 10 is moved in a vertical plane parallel to the plane YOZ, so as to localize the upper impact points A1 and B1 of the laser beam 14 on two opposite edges of the target 20 extending parallel to the direction OX. The impact of the laser beam 14 on the edges of the target 20 has the immediate effect of creating a plasma, which can be immediately detected by sensors or transducers installed in the equipment 22.

As illustrated by FIG. 1B, the nozzle 10 is then placed at a level such that the estimated position PFE of the focal point of the laser beam 14 is on this occasion above the target 20 at a distance d substantially identical to that vertically separating the estimated position PFE of the target 20 during the detection of the upper impact points A1 and B1.

The operations described previously with reference to FIG. 1A are then repeated in order to localize the lower impact points C1 and D1 of the laser beam 14 with the edges of the target 20 parallel to the axis OX.

The intersections of the lines A1, D1 and B1, C1, which link the upper and lower impact points on the opposite edges of the target, make it possible to determine a first calculated position of the focal point of the laser beam 14. This first calculated position of the focal point is designated by the reference PFC1 in FIGS. 1A, 1B and 2.

It should be noted that the order of operations described with reference to FIGS. 1A and 1B is of a random nature. The upper A1, B1 and lower C1, D1 impact points can thus be detected and localized in either the described order or in the reverse order.

The first calculated position PFC1 of the focal point is closer to the real position of this point than the estimated position PFE taken into account for determining the levels occupied by the nozzle 10 during the operations illustrated in FIGS. 1A and 1B. However, the localization precision remains inadequate.

The operations described hereinbefore with reference to FIGS. 1A and 1B are consequently repeated, by positioning on this occasion the nozzle 10 vertically in such a way that the target 20 is substantially at the same vertical distance d above and below the first calculated position PFC1 of the focal point. Thus, detection and localization take place of four new impact points between the laser beam 14 and the two sides of the target 20 parallel to the axis OX. These four impact points are designated by the references A2, B2, C2 and D2 in FIG. 2. They make it possible to determine a second calculated position PFC2 of the focal point. This second calculated position is nearer the real position than the first calculated position PFC1.

The exact position of the focal point in the plane YOZ could be obtained by repeating the aforementioned operations a certain number of times. However, this would suffer from the disadvantage of considerably lengthening the procedures carried out during the setting of the machine.

Thus, advantageously there is a limitation to the successive acquisition of two calculated positions PFC1 and PFC2 of the focal point in the plane YOZ and the focal point is localized in said plane by calculating the coordinates of the four intersection points of the different lines connecting the different upper and lower impact points on the opposite edges of the target, and then determining the mean of the coordinates of said four intersection points. More specifically, the four points used for this calculation are the points located at the intersections of the lines A2, D2 and B2, C2, A1, D1 and B1, C1, A1, D2 and B1, C2 and A2, D1 and B2, C1.

Figure 2:
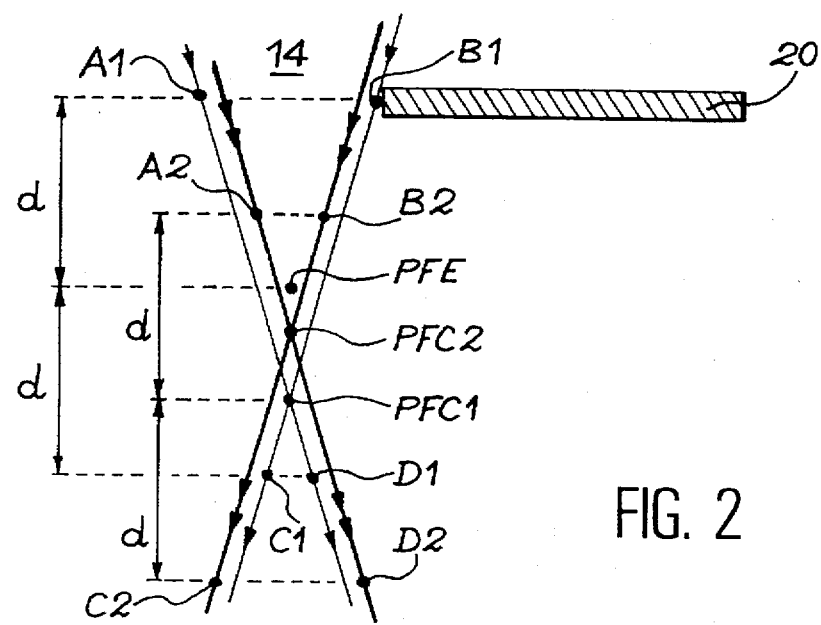
FIG. 2 show diagrammatically the following step of the process according to the invention during which four other impact points are detected and localized.

As has been indicated hereinbefore, all the operations described with reference to FIGS. 1A, 1B and 2 are repeated in the plane XOZ. A precise, reproducible space localization of the focal point of the laser beam 14 is consequently obtained.

In practice, it is clear that the error on the calculated positions PFC1 and PFC2 decreases with the increase in the vertical distances d separating the target 20 from the working planes in which is located the last calculated focal point. Conversely, the calculations performed for determining the space position of the focal point are based on mathematical hypotheses, which become false when these distances become excessive. For this reason, it is preferable to adopt an optimum vertical distance d of a few dozen millimeters between the target 20 and the estimated or previously calculated focal point.

A description will now be given with reference to FIGS. 3 to 5 of a preferred embodiment of the equipment 22 incorporating the interchangeable target 20 and the four sensors or transducers used for referencing and localizing the impact points of the laser beam on said target.

Figure 3:
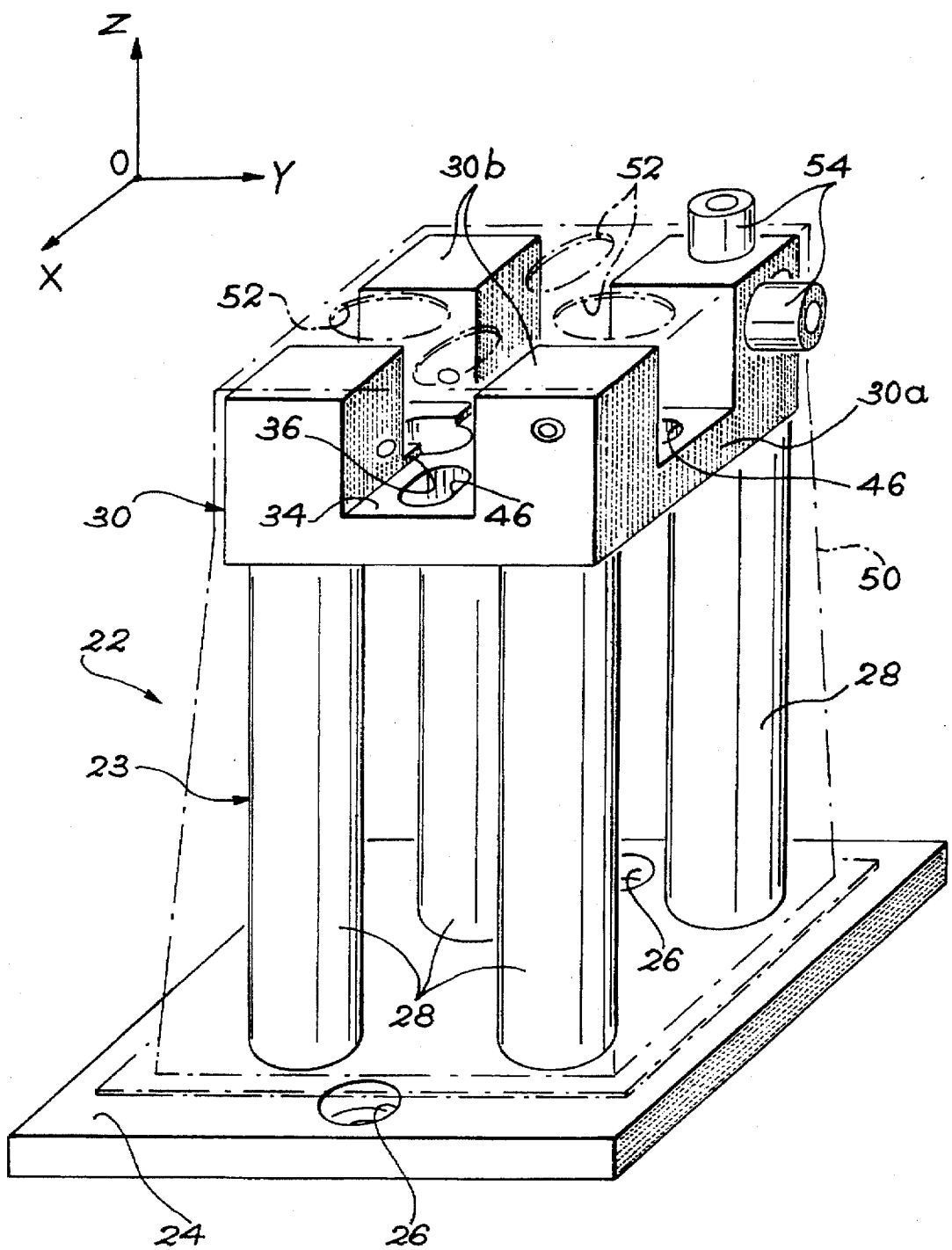
FIG. 3 is a perspective view showing the equipment for fixing to the work table of the machine, said equipment having four sensors for the detection of impacts, as well as the square target used during the steps illustrated diagrammatically in FIGS. 1A, 1B and 2.

As is illustrated in FIG. 3, the equipment 22 comprises a support 23 having a base 24 for fixing to the work table 18 (FIGS. 1A and 1B) by means of two screws traversing holes 26. The lower face of the base is consequently applied to the upper, horizontal face of the table 18.

Thus, the base 24 forms a horizontal base plate from which rise vertically four columns 28, whose axes form a square in plan view. At their upper ends, said four columns 28 support a stage 30 used both as a support for the target 20 and for light sensors 32 (FIGS. 4 and 5). These light sensors can in particular be constituted by phototransistors, photodiodes, field effect phototransistors, etc. As a variant, they can be replaced by heat sensors.

More specifically, the stage 30 is in the from of a square, horizontal plate 30a, extended upwards at each of its angles by a protuberance 30b shaped like a cube and used for housing one of the sensors 32. In its central portion located between the cube-shaped protuberances, the plate 30a has an upper, horizontal face 34, defined on two sides by overhanging edges 36 forming between a right angle and which respectively correspond to the orientations OX and OY in FIG. 1A. The square metal sheet forming the target 20 is placed at the thus formed location in such a way that one of its faces rests on the surface 34 and two of its sides bears on the overhanging edges 36.

In order to ensure the precise, reproducible positioning of the target 20 on the stage 30, a spring 38 is interposed between the protuberance 30b of said stage opposite to the intersection of the overhanging edges 36 and a truncated angle of the target 20. More specifically, this spring 38 is a leaf spring, whose ends bear on strips 40 (FIG. 4) located in vertical grooves made in the protuberance 30b of the stage 30.

Figure 5:
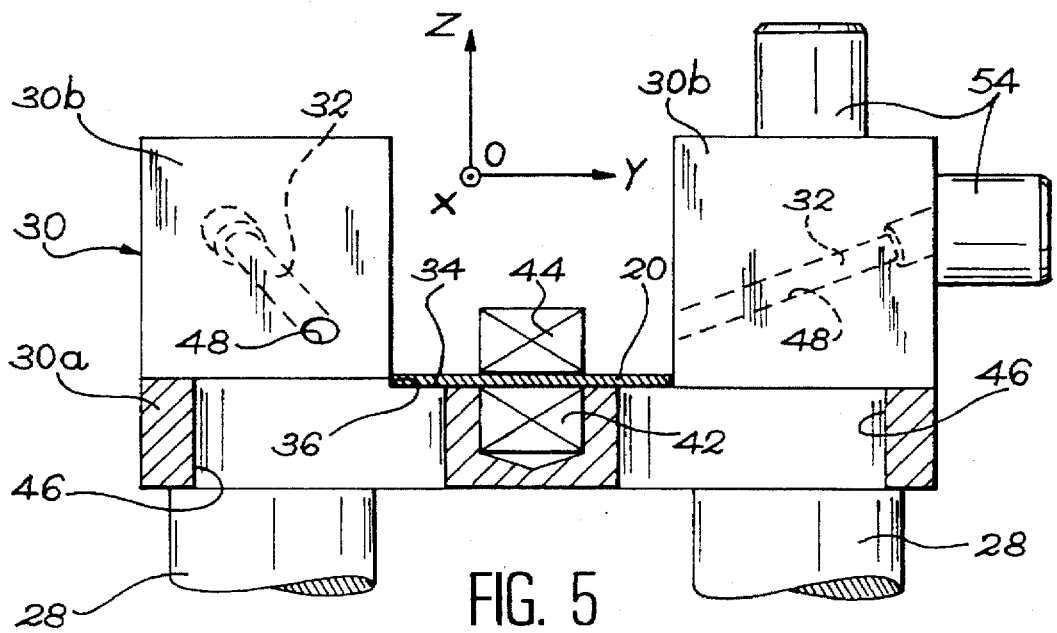
FIG. 5 is a sectional view along line V—V of FIG. 4.

The target 20 is held in the vertical direction by a pair of magnets 42, 44, as illustrated in FIG. 5. The magnet 42 is trapped in a recess formed in the centre of the surface 34 of the stage 30. However, the magnet 44 is free and is placed on the target 20 facing the magnet 42 when the target rests on the surface 34.

In order that the laser beam can traverse without damage the lower plate 30a of the stage 30 during the investigation of the beam impact points with the edges of the target 20, said lower plate has four windows 46 (FIG. 4) between the protuberances of the stage 30 and extending on either side of the four edges of the target when the latter is placed on the stage.

Figure 4:
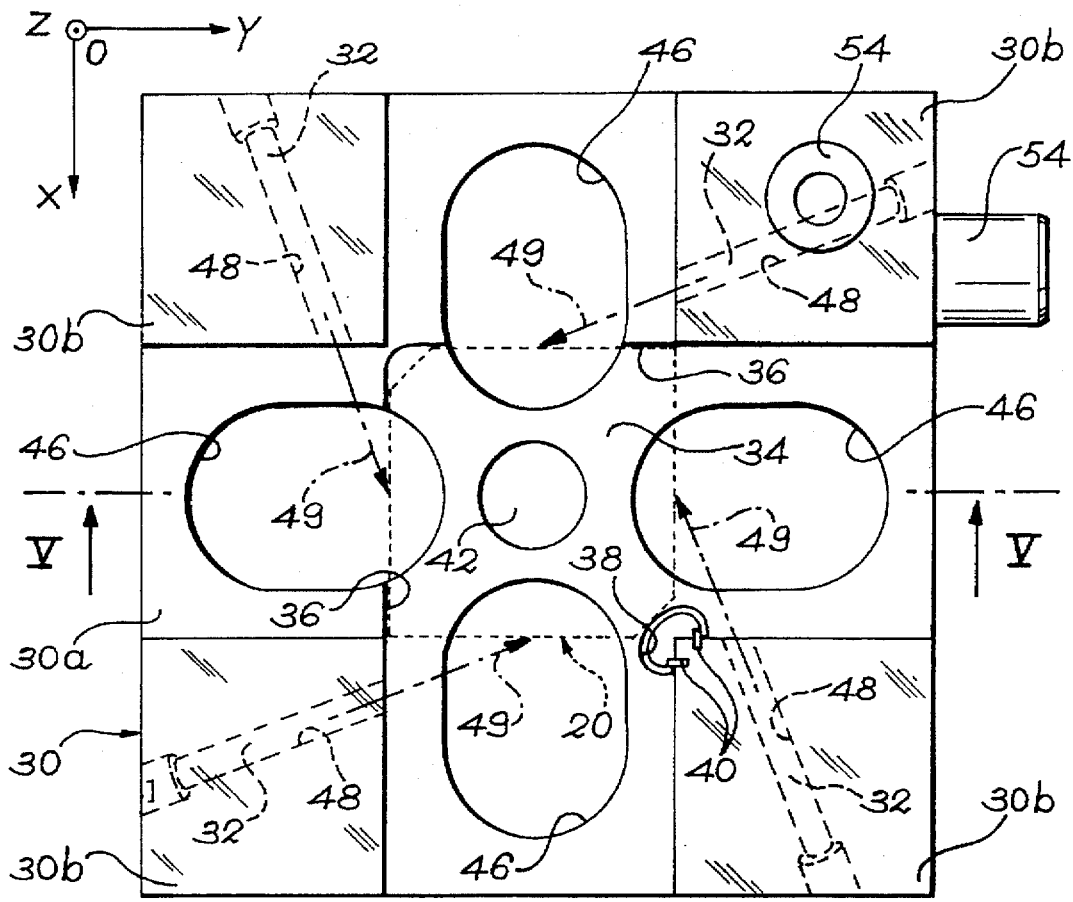
FIG. 4 is a plan view of the equipment of FIG. 3 after removing the protective cover.

As illustrated by FIGS. 4 and 5, each of the sensors 32 is located in a cylindrical recess 48 traversing one of the protuberances 30b of the stage 30. The axis 49 of each of the cylindrical recesses 48 is inclined downwards and towards the inside of the stage, so as to intersect one of the edges of the target 20 substantially in its centre. In the embodiment shown, the inclination of each of the cylindrical recesses 48 is such that its axis 49 forms an angle of approximately 20° with the horizontal and also with the corresponding side of the target 20 in plan view. This inclination is chosen in order to bring about the optimum efficiency and optimum possible precision for each of the sensors.

The equipment 22 shown in FIG. 3 firstly comprises a protective cover 50 completely covering the stage 30, as well as the columns 28 and which rests on the base 24. In its upper, horizontal face placed immediately above the stage 30, the protective cover 50 has four windows 52 placed vertically above the windows 46 of the stage 30. Like the windows 46, the windows 52 are used for the passage of the laser beam during the investigation of impacts of the latter with the four target edges.

To avoid light reverberations when using light sensors for detecting the impact points, the interior of the cover 50 and the support 23 are painted matt black.

The distance separating the stage 30 from the base 24, determined by the length of the columns 28, is chosen in such a way that the beam reaching the base 24 is sufficiently dispersed so as not to damage said base.

The only part subject to wear in the arrangement illustrated in FIG. 3 is the target 20. To replace said target when this proves necessary, the protective cover 50 is dismantled and the magnet 44 removed. When a new target has been put into place, it is merely necessary to replace the magnet 44 and cover 50 on the stage to make the arrangement operational again.

As is illustrated in FIG. 3, the support 23 is advantageously provided with reference marks by means of which the other machine adjustment operations and in particular the referencing of the equipment point can be carried out without making use of some other arrangement.

Thus, it is possible to see in FIG. 3 that one of the protuberances 30b of the stage 30 carries two hollow cylinders 54 on its upper face and on one of its faces turned towards the outside of the stage. The axes of the holes formed in the cylinders 54 are respectively parallel to the axes OY and OZ.

Obviously, these reference marks more particularly used for the referencing of the "equipment point" can be placed on a support separate from the support 23 without passing outside the scope of the invention.

I claim:

1. A process for the space localization of a focal point of a laser beam of a machining machine with respect to a work table of said machine, said process comprising the following steps:
   a—fixing a target to the work table, the target having four edges forming a square target in a first plane (XOY),
   b—emitting the laser beam in such a way that an axis thereof is perpendicular to the first plane (XOY), displacing the laser beam in a second plane (YOZ) that is perpendicular to the first plane and to a first pair of parallel edges of the square target, so that an estimated position (PFE) of the focal point of the laser beam is successively placed in two working planes parallel to the first plane (XOY) and located substantially equidistantly on either side of said first plane, detecting a first series of four impact points (A1, B1, C1, D1) of the laser beam on the first pair of parallel edges of the square target and determining a calculated position (PFC1) of the focal point in a second plane, located at an intersection of two lines (A1 D1, B1 C1) linking the impact points located on the first pair of parallel edges of the square target and in the two working planes,
   c—repeating step b at least once, successively placing the first plane on either side of the calculated position (PFC1) of a last calculated focal point,
   d—repeating steps b and c in a third plane (XOZ) that is perpendicular to the first and second planes to determine a calculated position of the focal point in said third plane.

2. The process according to claim 1, wherein detection of the impact points takes place by fixing an impact localization means to the work table.

3. The process according to claim 2, wherein the impact localization means comprises light sensors.

4. The process according to claim 2, wherein the impact localization means comprises heat sensors.

5. The process according to claim 2, wherein the target and four impact localization means are mounted in a support, so that the impact localization means are oriented towards an intersections of the target edges with the second and third planes and the support is fixed to the work table.

6. The process according to claim 5, further comprising providing a support having reference marks permitting a space localization of a nozzle emitting the laser beam with respect to the work table.

7. The process according to claim 1, wherein the target comprises a square metal sheet, which is fixed parallel to an upper face of the work table.

8. The process according to claim 1, wherein the working planes are located at a distance of a few dozen millimeters on either side of the first plane.

9. The process according to claim 1, wherein step b is repeated once in order to detect a second series of four impact points (A2, B2, C2, D2) for determining four calculated positions of the focal point in the second plane (YOZ) on the basis of the first and second series of impact points and a mean value of these four calculated positions is calculated to obtain a localization of the focal point in the second plane.

10. Equipment for the space localization of the focal point of a laser beam of a machining machine with respect to a work table of said machine, wherein said equipment comprises a support fixable to the work table, an interchangeable target comprising a square metal sheet mounted on the support at a given location and with a given orientation and four means for localizing impacts of the laser beam on the target, installed in the support so as to be oriented towards the four edges of the target.

11. Equipment according to claim 10, wherein a means for location is provided for receiving the target comprises a planar surface parallel to one face of the support and fixable to the work table and two overhanging edges of said planar surface, forming between them a right angle, means being provided for keeping the target in engagement with the planar surface and against the overhanging edges.

12. Equipment according to claim 11, wherein the means for securing the target comprises an elastic means engaging the target with the overhanging edges and a magnet means engaging the target against the planar surface.

13. Equipment according to claim 10, wherein the impact localization means are light sensors and the equipment also comprises a protective cover having windows for the passage of the laser beam, the interior of the cover and the support being painted matt black.

14. Equipment according to claim 10, wherein the support is provided with reference marks.

* * * * *